(No Model.) 3 Sheets—Sheet 1.
E. HOUTZ.
ROAD SCRAPER.
No. 412,620. Patented Oct. 8, 1889.
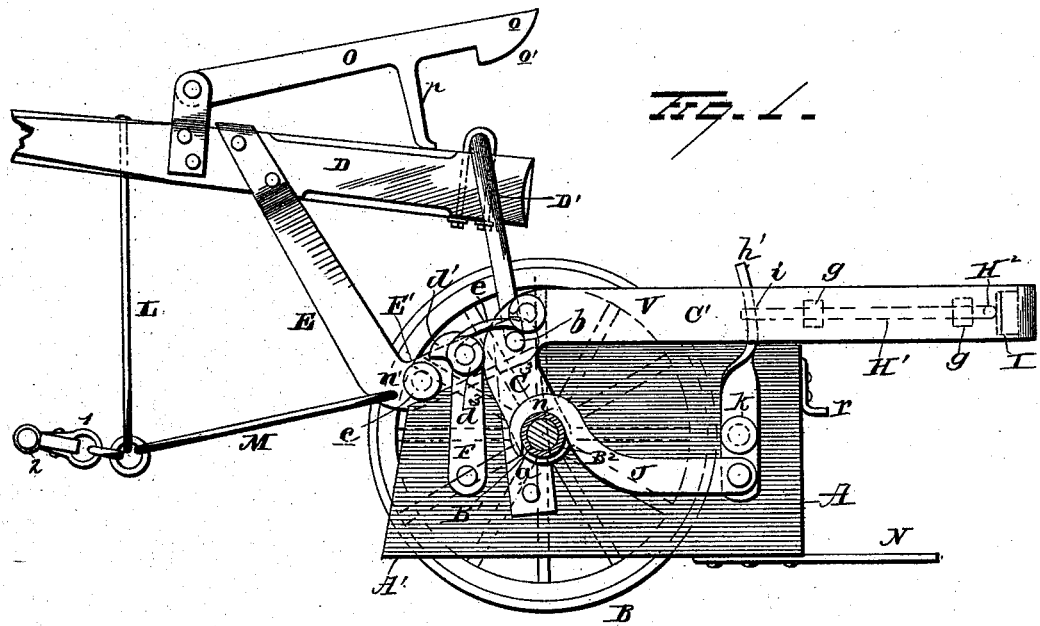
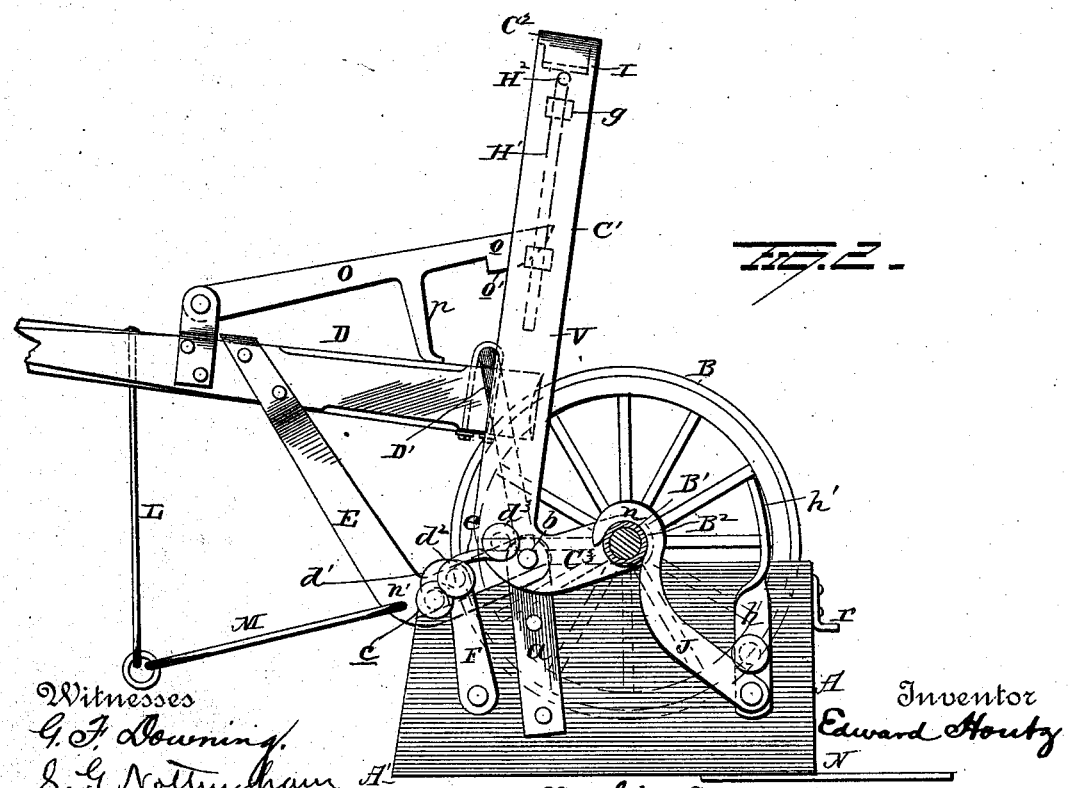
Witnesses
G. F. Downing
S. G. Nottingham
Inventor
Edward Houtz
By his Attorneys
Leggett & Leggett (No Model.) 3 Sheets—Sheet 2.
E. HOUTZ.
ROAD SCRAPER.
No. 412,620. Patented Oct. 8, 1889.
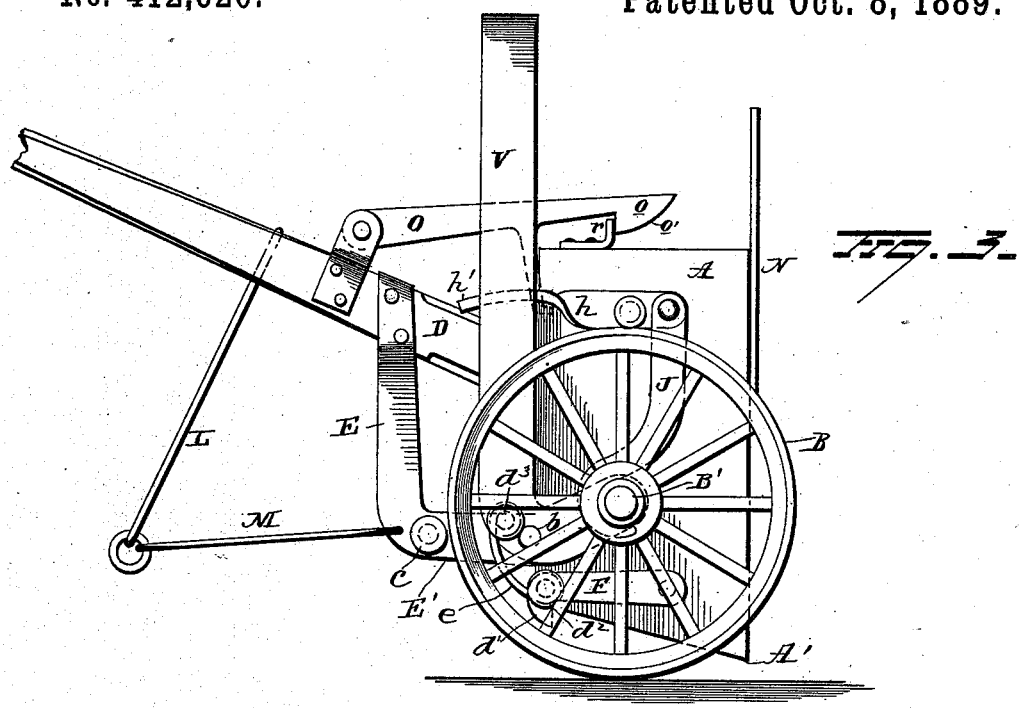
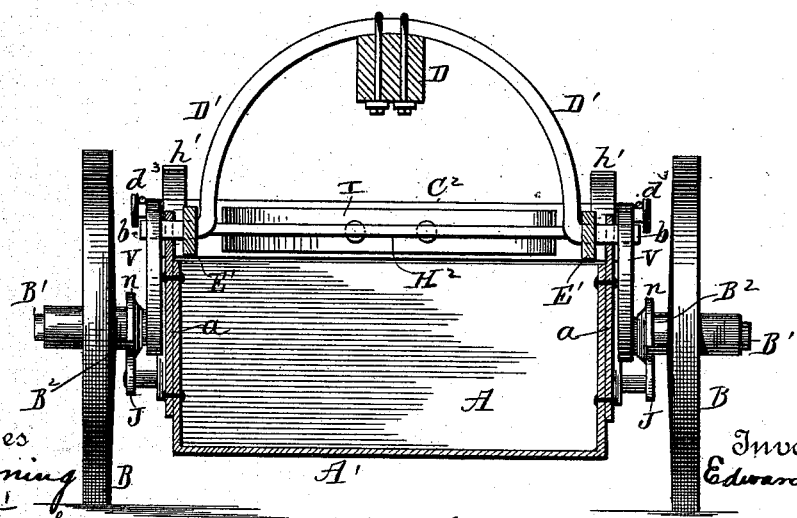
Witnesses
G. F. Downing
S. G. Nottingham
Inventor
Edward Houtz
By his Attorneys
Leggett and Leggett (No Model.) 3 Sheets—Sheet 3.
E. HOUTZ.
ROAD SCRAPER.
No. 412,620. Patented Oct. 8, 1889.
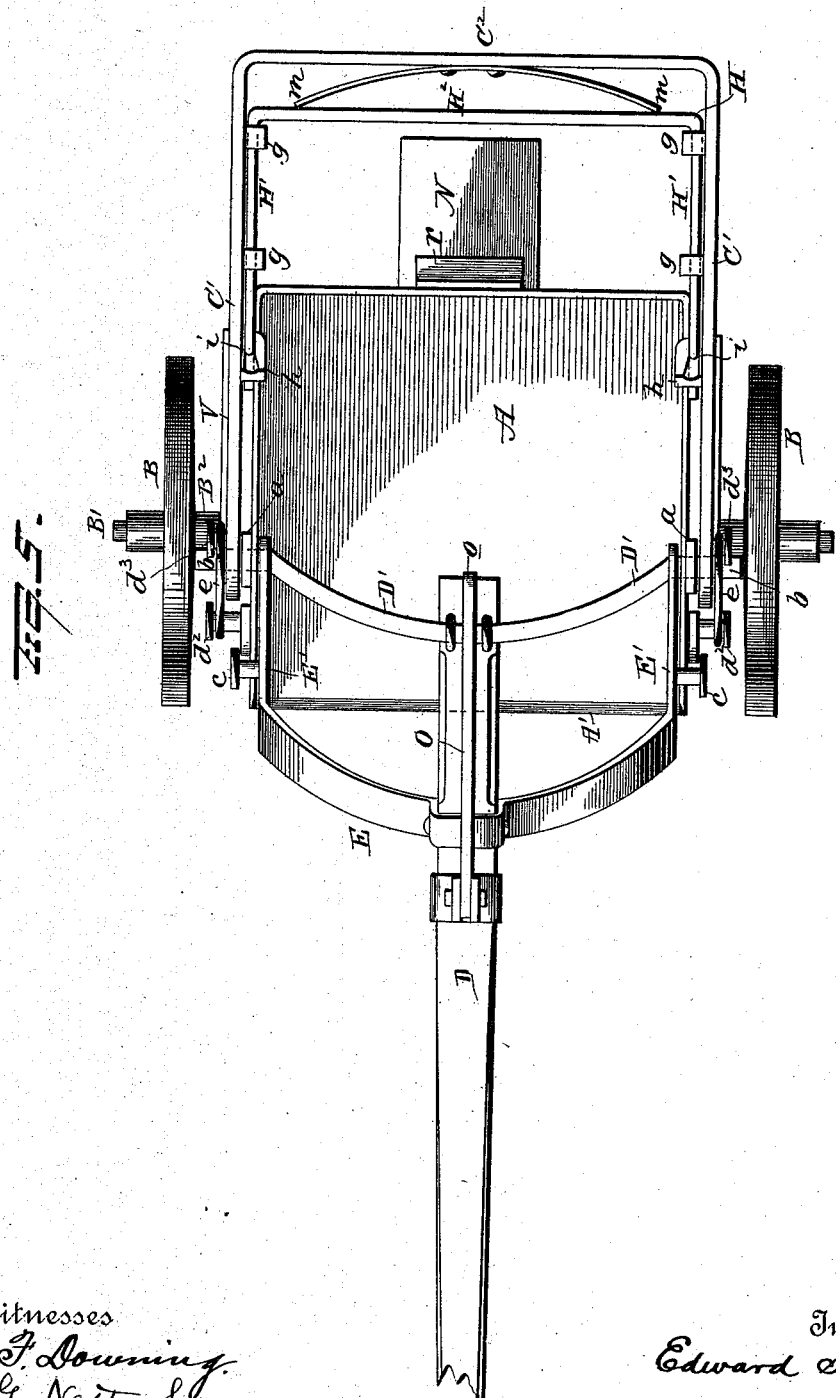
Witnesses
G. F. Downing
S. G. Nottingham
Inventor
Edward Houtz
By his Attorneys
Leggett and Leggett

UNITED STATES PATENT OFFICE.

EDWARD HOUTZ, OF BLUNT, ASSIGNOR OF TWO-THIRDS TO JAMES C. STEBBINS AND JULIUS A. JOHNSON, BOTH OF PIERRE, DAKOTA TERRITORY.

ROAD-SCRAPER.

SPECIFICATION forming part of Letters Patent No. 412,620, dated October 8, 1889.

Application filed June 13, 1888. Serial No. 276,975. (No model.)

*To all whom it may concern:*

Be it known that I, EDWARD HOUTZ, of Blunt, in the county of Hughes and Territory of Dakota, have invented certain new and useful Improvements in Road-Scrapers; and I do hereby declare the following to be a full, clear, and exact description of the invention, such as will enable others skilled in the art to which it appertains to make and use the same.

My invention relates to an improvement in wheeled scrapers for road-grading and other purposes.

One object of my invention is to produce a wheeled scraper which will be easy to operate, and that may be made to discharge its load at any desired locality.

A further object is to so construct the draft apparatus of a road-scraper that the tongue will be slightly elevated from the necks of the draft-animals, and thus prevent galling and objectionable pressure on their necks, which is incidental to ordinary road-graders.

With these objects in view my invention consists in certain features of construction and combinations of parts, which will be hereinafter described, and pointed out in the claims.

Referring to the drawings making a part of this specification, Figure 1 is a side elevation of the road-scraper adjusted to enter the ground or take a load, the wheel being removed to show parts it would conceal. Fig. 2 is a side elevation with the scraper adjusted to cut a deep channel. Fig. 3 is a side elevation of the scraper in the position assumed when a load is dumped. Fig. 4 is a rear end elevation of the machine adjusted to receive a load. Fig. 5 is a plan view of the scraper adjusted to enter the ground.

A represents the ground scoop or shovel, consisting of a rectangular box of metal with front side removed. The bottom surface A' is flat, with its forward edge sharpened. The end and side walls are preferably made vertical, or at right angles to the bottom, and their free edges are also sharpened to produce cutting-edges. The shovel A is mounted upon two wheels B, which are of substantial construction and a diameter proportioned to the length of the shovel A, as will be further explained. The wheels B are revolubly mounted upon stub-axles B', that project from the rocking lever V. Said lever is bent to form a rectangular loop, the parallel limbs C' of which are separated by the integral cross-bar $C^2$ a sufficient distance, so as to permit these limbs to properly clear the sides of the shovel. The ends of the limbs C' are bent edgewise to extend downwardly and rearwardly, thus producing the short arms $C^3$. Upon the extremities of the short bent arms $C^3$ the stub-axles B' project laterally at opposite points in the same axial line, and of sufficient length to afford proper support to the wheels B, as has been before mentioned, the inner ends of the wheel-hubs $B^2$ having proper length to remove the wheels a working distance from the sides of the shovel, and also for the engagement of other devices, as will be more fully described further on.

On the sides of the shovel A, at opposite points which are forward of the center of length of the same, the plates *a* are secured, and project above the top edges of the sides of the shovel, the projecting ends being perforated. A tongue D is provided, which is supported by an arched yoke D', that has studs formed on or affixed to its ends, said studs extending oppositely in the same plane and made to loosely engage the perforations made in the upper ends of the plates *a*. The yoke D' is secured at the center of its arch to the rear end of the tongue or pole D, so that the tongue is elevated a proper distance above the scraper or shovel A and may be vibrated vertically on its yoke-support. The ends or studs of the yoke D' are extended to form journals *b*, and the limbs C' are perforated at the junction of the short bent arms $C^3$ therewith to engage these journals, so as to allow the lever V to rock thereon and elevate the wheels B when the lever is made to approach a vertical position. Two mating bracket-arms E are secured to the tongue D forward of the yoke D', and bent outwardly and downwardly to produce arched braces. The lower portions E' of the bracket-arms E are bent edgewise to the rear at right angles to the other or laterally-curved portions, and the ends of these arms E' are perforated to be placed on the journal ends $b$ of the yoke D', said arms being adapted to vibrate inside of the vertical side walls of the shovel A, while the lever V is located outside of the same.

On the outside surfaces of the bracket-arms E, near the corners where the short arms E' are integrally bent rearward at a right angle therefrom, the studs $c$ are made to project. These are intended to receive the hooks $d'$, formed on the upper ends of the upright arms F, which are pivoted by their lower ends to the outside surface of the side walls of the shovel near their free forward edges, and also to bear on the upper front edge of the scraper and prevent same from rising when the vertical line of the pivot $b$ is in advance of the center of gravity of the load, as it is when the shovel is being raised from the digging to the carrying position. Each of the hooks $d'$ have projecting pins $d^2$ formed on or affixed to their outer faces, and two links $e$ of equal length are loosely secured to these pins, the opposite perforated ends of the links engaging similar pins or studs $d^3$, formed on the lever-limbs C' at opposite points immediately above the journals $b$. The length of the links $e$ and arms F are so proportioned that when the lever V is in a vertical position the hooks $d'$ will engage the pins $d^2$.

Upon each side of the shovel A, near the vertical rear corners of the same, the plates $h$ are attached. Said plates extend above the sides of the shovel and are given a quarter-turn, so that the sides of these projecting portions will be at right angles to the side walls. The upper projecting portions $h'$ of the plates $h$ are bent forwardly to afford curved surfaces flatwise of the plates, and perforations $i$ are made in these curved faces.

On the inside surfaces of the rectangularly-bent lever V sliding bars H' are secured, which loosely engage the perforated ears $g$, that project inwardly from the limbs C' of the lever, said bars H' being of such relative length as to enter the perforations $i$ of the curved plate ends $h'$ when the lever V is depressed to lie parallel with the top edges of the shovel. The integral cross-bar H² of the locking slide-bars H' are engaged by a plate-spring I, which is secured near its center to the adjacent surface of the lever V, having its ends $m$ curved to cause their terminals to bear upon the cross-bar and press the slide-bars toward the pivotal connections of the lever V, so that when said lever is depressed to lie nearly in a horizontal plane the slide-bars will have locking engagement with the curved ends $h'$ of the plates $h$ or the perforations $i$ made in them. Near the lower ends of the plates $h$ there are studs $k$ affixed, which project from their faces, and below these studs the lower ends of the curved hook-plates J are pivoted, the upper edges of these hook-plates having contact with these studs to limit their vertical movement. The upper ends $n$ of the hook-plates J are bent edgewise to produce hooks that are adapted to engage the top surface of the wheel-hubs or stub-axles when the lever V is made to assume a vertical position. A metal arm L is made to project downwardly from the tongue D at a proper point in advance of the bracket-arms E, its length being such with regard to the lower corners $n'$ of said bracket-arms that the bent metal rod-brace M, which is attached rigidly to these corners and also to the lower end of the arm L, will lie in nearly a horizontal plane, the brace M being intended to stiffen the depending arm L. A ring is formed on or secured to the lower end of the arm L, to which a doubletree 1 and pair of singletrees 2 are swivel secured for the attachment of a team of horses or other draft-animals. It will be seen that the point of attachment of the draft force is about on a line with the horizontal plane of the stub-axles B' when the lever V is in horizontal position, and when this lever is raised to a vertical position the line of draft will be considerably below the centers of wheels B. When the lever V is in depressed adjustment and its slide-bolts are locked fast to the curved plates $h'$, the forward movement of the shovel A and a controlled rocking depression of the cutting-edge of said shovel through a manipulation of the lever by the driver of the team will cause the shovel to engage the soil to be excavated. When it has taken a proper depth of ground slice, the lever should be depressed and retained horizontally, which will enable the shovel to fill, and when full a further depression of the handle or lever V will elevate the front edge, so as to cause it to rise from the soil and the shovel to ride upon the ground surface to a point of desired discharge, where the load may be dumped by an upward pressure on the lever V, which will cause the shovel edge to catch on the ground and the bottom wall of the shovel to assume a vertical position. There is a hook O pivoted at one end to the top surface of the tongue D by suitable brackets or clips, its free hooked end $o$ projecting rearwardly to lie above the rear end of the tongue, and it is supported in this position by a depending arm $p$, that is made integral with the hook-body and of such a length as to rest with its free end on the tongue and hold the hook end $o$ elevated sufficiently to permit its sloped edge $o'$ to impinge against the projecting lip of the bracket-lug $r$, which is fastened to the rear wall of the shovel at a proper distance below the top edge of said shovel, so as to interlock with the hook $o$ and hold the shovel in vertical adjustment when the load is dumped and the shovel is being transported to the starting-point again to receive another load. In order to hold the tongue in proper alignment with and above the shovel A, the studs $c$ are secured to the sides of the arms E' near their lower edges, as before stated, which studs are engaged by the top edges of the shovel, while the hooks $d'$ are engaged with the studs $c$, so that the parts are connected to lock the tongue and shovel in proper relation to each other when the latter named is set to excavate a deep channel. From the position given the doubletree 1 and singletrees 2 the line of draft will be such as to cause the traces of the harness on the horses to lie in an inclined plane, the ends which connect to the singletrees being the lowest, so that the pulling action of the team will raise the tongue slightly at the front end and prevent it from injuriously bearing upon and galling the necks of the animals. This is one of the important features of this invention. Should it be desired to excavate deeper, or, rather, give the shovel a greater depth of cut in the soil, this may be done by the elevation of the lever V until the hookplates J have their ends $n$ in engagement with the wheel-hubs and the other pair of hooks $d'$ are interlocked with the studs $c$, and when such an engagement of parts is produced the wheels will be elevated and held free to rotate while the shovel is locked with its lower wall in a horizontal plane, so that its cutting-edge will penetrate into the soil, until the wheels are in contact with the surface of the same. A small rearwardly-extended platform N is affixed to the rear wall of the shovel near its lower edge. This is provided for the accommodation of a driver, who can easily step on or off this bracket-shelf and add his weight to the scraper when it is necessary to regulate the depth of cut; or when the lever V is in elevated adjustment and it is required to lower it the platform will be useful to enable the driver to reach the lever without stopping the progress of the machine.

Many slight changes might be made in the details of construction of this device without exceeding the scope of the invention; hence I do not desire to confine myself to the exact forms herein shown; but, Having fully described my invention, what I claim as new, and desire to secure by Letters Patent, is—

1. In a road-scraper, the combination, with a shovel, a lever carrying axle-spindles, wheels mounted on said spindles, a tongue, and a yoke connecting the tongue and shovel, of a bracket-arm secured to the tongue and having a lateral projection for limiting the upward movement of the front end of the shovel, substantially as set forth.

2. The combination, with a shovel, of a pair of wheels adjustable for height with respect to the shovel, a yoke pivotally secured to the shovel, a tongue having its rear end secured to the center of yoke, and bracket-arms secured to the tongue and to the ends of the yoke, substantially as set forth.

3. In a road-scraper, the combination, with a bent lever carrying axle-spindles, wheels mounted thereon, a tongue, and a yoke connecting the tongue with the shovel and bent lever, of a plate attached to the shovel, a sliding bolt secured to the bent lever and adapted to engage the plate, a bracket having a projection thereon, and a movable hook adapted to engage said projection when the shovel is in its depressed position, substantially as set forth.

4. In a road-scraper, the combination, with a shovel having a flat bottom and vertical sides, which are adapted to excavate soil, a lever having bent arms, stub-axles secured to these arms, and wheels mounted on the axles, of a tongue, a yoke secured to the rear end of the tongue, bracket-arms that support the tongue laterally, a depending draft-bar, stay-rods for the draft-bar, and means for attachment of draft-animals to the draft-bar below the tongue, substantially as set forth.

5. In a road-scraper, the combination, with a shovel and two upwardly-projecting curved and perforated locking-plates affixed to the opposite sides of the shovel, of a bent lever, each member or arm of which is bent downwardly at its forward end, wheels journaled on axles secured to the bent ends of said members or arms, and a bent sliding bar that is adapted to slide on the bent lever and engage with the perforations in the curved locking-plates, substantially as set forth.

6. In a road-scraper, the combination, with a shovel and a bent lever having two parallel limbs with bent ends and carrying two stub-axles and two wheels, of two hook-plates pivoted on the shovel-sides and adapted to hook over the axles or wheel-hubs, substantially as set forth.

7. In a road-scraper, the combination, with a shovel having a flat bottom and upright side walls, all adapted to cut earth with their front edges, a tongue, bracket-plates, and an arched yoke provided with journal ends, which serve as pivots on which the tongue vibrates vertically, of a bent rocking lever, a bent slide-bar, two curved locking-plates, with which the slide-bar can engage, two links, and two vertically-vibrating hooks connected by the links to the bent rocking lever and adapted to lock fast to the bracket-arms of the tongue when the bent rocking lever is vibrated vertically, substantially as set forth.

In testimony whereof I have signed this specification in the presence of two subscribing witnesses.

EDWARD HOUTZ.

Witnesses:
J. I. HOUTZ,
C. N. SUKES.